(12) United States Patent
Naka et al.

(10) Patent No.: US 8,752,080 B2
(45) Date of Patent: Jun. 10, 2014

(54) TURNTABLE HAVING ELASTIC LAYER WITH HIGH CONTACT PRESSURE PORTION

(75) Inventors: Teruyuki Naka, Osaka (JP); Shinichi Maeda, Osaka (JP); Yuji Ariyoshi, Osaka (JP); Masuo Maruyama, Osaka (JP); Hiroshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/808,385

(22) PCT Filed: Jan. 19, 2012

(86) PCT No.: PCT/JP2012/000305
§ 371 (c)(1),
(2), (4) Date: Jan. 4, 2013

(87) PCT Pub. No.: WO2012/111253
PCT Pub. Date: Aug. 23, 2012

(65) Prior Publication Data
US 2013/0111507 A1    May 2, 2013

(30) Foreign Application Priority Data

Feb. 15, 2011   (JP) ................................. 2011-029768

(51) Int. Cl.
*G11B 17/028*   (2006.01)

(52) U.S. Cl.
USPC ...................................................... 720/715

(58) Field of Classification Search
CPC ............... G11B 19/2009; G11B 33/08; G11B 17/0284; G11B 17/0282; G11B 19/2027; G11B 7/0953

USPC .................................................. 720/715–717
See application file for complete search history.

(56) References Cited

U.S. PATENT DOCUMENTS

| | | | | |
|---|---|---|---|---|
| 4,054,291 | A | * | 10/1977 | Maeda .......................... 369/266 |
| 4,234,195 | A | * | 11/1980 | Shibata ....................... 369/271.1 |
| 5,995,480 | A | * | 11/1999 | Naka et al. ..................... 720/716 |

(Continued)

FOREIGN PATENT DOCUMENTS

| | | |
|---|---|---|
| JP | 61-029450 A | 2/1986 |
| JP | 62-117752 U | 7/1987 |

(Continued)

OTHER PUBLICATIONS

Partial English computer translation of Takagi et al (JP 2008-181622), 19 pages.*

(Continued)

*Primary Examiner* — Brian Miller
(74) *Attorney, Agent, or Firm* — Renner, Otto, Boisselle & Sklar, LLP

(57) ABSTRACT

Provided is a turntable for rotatably supporting a disc member on a disc support surface in a state where the disc member is sandwiched and held between the turntable and a clamp member placed opposite thereto, wherein the disc support surface is provided with an elastic layer having a predetermined width, and configured to project from the disc support surface, and at least one of an outer peripheral part and an inner peripheral part of the elastic layer is provided with a high contact pressure portion of which a contact pressure generated by pressing the clamp member thereto is higher than that of other portion.

6 Claims, 7 Drawing Sheets

(56) References Cited

U.S. PATENT DOCUMENTS

| | | | |
|---|---|---|---|
| 6,577,587 B1 * | 6/2003 | Kishibe et al. | 720/700 |
| 6,871,352 B2 * | 3/2005 | Kurosaka et al. | 720/707 |
| 7,512,958 B2 * | 3/2009 | Kim et al. | 720/715 |
| 7,610,594 B2 * | 10/2009 | Masuda et al. | 720/716 |
| 8,495,669 B2 * | 7/2013 | Aman et al. | 720/722 |
| 2007/0000119 A1 | 1/2007 | Masuda et al. | |

FOREIGN PATENT DOCUMENTS

| | | | |
|---|---|---|---|
| JP | 2-105259 U | | 8/1990 |
| JP | 3-23847 U | | 3/1991 |
| JP | 4-125845 A | | 4/1992 |
| JP | 8-96459 A | | 4/1996 |
| JP | 11-328794 A | | 11/1999 |
| JP | 2000-339921 A | | 12/2000 |
| JP | 2006202448 A | * | 8/2006 |
| JP | 2007-012194 A | | 1/2007 |
| JP | 2008-181622 A | | 8/2008 |
| JP | 2008181622 A | * | 8/2008 |
| JP | 2008305471 A | * | 12/2008 |
| JP | 2009223932 A | * | 10/2009 |

OTHER PUBLICATIONS

International Search Report for corresponding International Application No. PCT/JP2012/000305 mailed Feb. 28, 2012.

Form PCT/ISA/237 for corresponding International Application No. PCT/JP2012/000305 mailed Feb. 28, 2012.

International Preliminary Report on Patentability for corresponding International Application No. PCT/JP2012/000305 (English Translation dated Aug. 21, 2013).

* cited by examiner

TURNTABLE HAVING ELASTIC LAYER WITH HIGH CONTACT PRESSURE PORTION

TECHNICAL FIELD

The present invention relates to a turntable for rotatably supporting a disc member such as an optical disc.

BACKGROUND ART

As is known, a so-called disc drive which reproduces an information signal recorded on a disc-like recording medium such as an optical disc and/or which records an information signal on a disc-like recording medium is provided with a turntable which rotatably supports the disc-like recording medium.

In such a disc drive, the disc-like recording medium is placed on a disc support surface of the turntable, the disc-like recording medium is sandwiched and held between the disc support surface and a clamp member placed opposite thereto, a motor (so-called spindle motor) having an output shaft which is, for example, integrally assembled into the turntable is driven, and the turntable for supporting the disc-like recording medium on the disc support surface is rotated. During this operation, a disc-sandwiching and holding force between the turntable and the clamp member can be obtained by utilizing a spring force of a spring, or a magnetic force of a magnet provided on at least one of the turntable and the clamp member, for example.

Concerning the turntable incorporated in the disc drive, in order to prevent a slip from generating between the disc support surface of the turntable and the disc member (disc-like recording medium), it is known to provide, on disc support surface, an elastic layer made of such as rubber which increases a friction force between the disc support surface and the disc member (see Patent Literature 1, for example). It is recognized that such a slip between the disc support surface and the disc member is prone to generate when the number of rotations of the turntable is varied, and it is known that, if the slip generates, it becomes difficult to keep an appropriate focus control.

PATENT LITERATURES

[Patent Literature 1]: JP 4-125845 A

DISCLOSURE OF THE INVENTION

Problems to be Solved by the Invention

In General, a surrounding environment where a disc drive is disposed is assumed to includes, in many cases, dust such as cilia of clothes, carpets and animals, or other kinds of dust. Under such an environment, it is extremely difficult to completely prevent dust from entering the disc drive. Especially when a disc is exchanged, it is almost impossible, in general, to prevent a part of dust from entering into the disc drive.

When dust which enters the disc drive attaches to a surface of the elastic layer provided on the disc support surface of the turntable, especially when the dust partially has a certain level of thickness or more on the elastic layer surface, there is a problem that a friction coefficient of the elastic layer surface is remarkably lowered and a generation-preventing effect of a relative slip between the disc support surface and the disc member is deteriorated.

Further, when such an elastic layer is provided on the disc support surface, it is common way to previously form the elastic layer by pouring flowable-state rubber material into a predetermined molding die, and past the molded elastic layer onto the disc support surface.

However, if such a rubber molding is used as it is for the elastic layer, since there are limitations to secure a shape and dimensional accuracy of the elastic layer molded by rubber, there is fear that, for example, a height of the elastic layer from the disc support surface of the turntable is unavoidably varied, and a difference (unevenness in height) of a certain level or more is generated especially in a circumferential direction of the turntable.

When a disc member is placed/supported on the elastic layer having uneven height and the turntable is rotated, since the disc member rotates in an inclined state with respect to the disc support surface, there is a problem that a so-called surface deflection during the rotation is generated.

It is a basic object of the present invention to provide a turntable capable of effectively maintain a generation-preventing effect of a relative slip between a disc support surface and a disc member even if dust attaches to a surface of an elastic layer provided on the disc support surface. And, it is another basic object of the present invention to provide a turntable capable of effectively suppressing a surface deflection during the rotation of the disc member in a case where the elastic layer is provided on the disc support surface.

Means for Solving the Problems

Thus, according to a first aspect of the present invention, there is provided a turntable for rotatably supporting a disc member on a disc support surface in a state where the disc member is sandwiched and held between the turntable and a clamp member placed opposite thereto, wherein the disc support surface is provided with an elastic layer having a predetermined width, and configured to project from the disc support surface, and wherein at least one of an outer peripheral part and an inner peripheral part of the elastic layer is provided with a high contact pressure portion of which a contact pressure generated by pressing the clamp member thereto is higher than that of other portion.

According to this configuration, at least one of the outer peripheral part and the inner peripheral part of the elastic layer is provided with the high contact pressure portion in which the contact pressure generated by pressing the clamp member thereto is higher than that of other portion. Therefore, in this high contact pressure portion, elastic deformation caused by pressing the clamp member to the high contact pressure portion becomes greater than that of the other portions, and even if dust attaches to a surface of the elastic layer of the turntable, it becomes easy to embed the dust into the elastic layer. Especially, when the high contact pressure portion deforms, it deforms while further increasing a contact area to push away the dust attached to the surface toward at least one of the outer periphery side and the inner periphery side of the elastic layer. Therefore, it is possible to avoid a case where dust attached to the surface of the elastic layer partially has a certain level of thickness or more on the surface, and a friction coefficient of the elastic layer surface is remarkably deteriorated.

In this case, it is preferable that the high contact pressure portion is provided with a notch which opens to the periphery side of the elastic layer as viewed from above.

According to this configuration, since the notch which opens to the periphery side as viewed from above is provided, an edge portion (plane edge portion) is formed in a plane at an intersection between the notch and the peripheral edge. When the clamp member is depressed, the plane edge portion deforms while increasing the contact area, and it is possible to more effectively disperse dust attached to the plane edge portion.

In the above cases, it is preferable that the high contact pressure portion is formed by an edge portion (cross section edge portion) projecting to form a predetermined angle in a vertical cross section which cuts across the disc support surface in its radial direction.

According to this configuration, the high contact pressure portion is formed by the cross section edge portion projecting to form the predetermined angle in the vertical cross section which cuts across the disc support surface in its radial direction. Therefore, elastic deformation caused by the depressing movement of the clamp member is further increased as compared with other portion, and even when dust attaches to the surface, it becomes easier to embed the dust into the elastic layer. Especially when the elastic layer deforms, it deforms while further increasing the contact area to push away the dust attached to the surface toward at least one of the outer periphery side and the inner periphery side of the elastic layer, and the dust attached to the surface of the cross section edge portion can further effectively be dispersed.

In the above cases, it is preferable that the high contact pressure portion is formed by cutting work after the elastic layer is fixed onto the disc support surface.

According to this configuration, as compared with a case where a rubber molding is used as it is for the elastic layer, a height of the elastic layer from the disc support surface of the turntable can be formed more uniform. Accordingly, when the disc member is placed/supported on the elastic layer and the turntable is rotated, it is possible to effectively suppress the generation of a surface deflection.

Further, according to a second aspect of the present invention, there is provided a turntable for rotatably supporting a disc member on a disc support surface in a state where the disc member is sandwiched and held between the turntable and a clamp member placed opposite thereto, wherein the disc support surface is provided with an elastic layer having a predetermined width, and configured to project from the disc support surface, and wherein the elastic layer is provided with an edge portion (cross section edge portion) projecting to form a predetermined angle in a vertical cross section which cuts across the disc support surface in its radial direction.

According to this configuration, the elastic layer is provided with the cross section edge portion projecting to form a predetermined angle in a vertical cross section which cuts across the disc support surface in its radial direction. Therefore, in this cross section edge portion, elastic deformation caused by the depressing movement of the clamp member becomes greater than that of the other portion, and even if dust attaches to a surface of the turntable, it becomes very easy to embed the dust into the elastic layer. Especially, when the cross section edge portion deforms, it deforms while further increasing a contact area of the cross section edge portion and the dust attached to the surface of the cross section edge portion can more effectively be dispersed. Therefore, it is possible to avoid a case where dust attached to the surface of the elastic layer partially has a certain level of thickness or more on the surface, and a friction coefficient of the elastic layer surface is remarkably deteriorated.

In this case, it is preferable that the cross section edge portion is provided on at least one of an outer peripheral part and an inner peripheral part of the elastic layer.

According to this configuration, when the cross section edge portion deforms, it deforms while further increasing the contact area to push away dust attached to the surface toward at least one of the outer periphery side and the inner periphery side of the elastic layer, and the dust attached to the surface of the cross section edge portion can more effectively be dispersed.

In this case, it is preferable that the cross section edge portion is provided with a notch which opens to a periphery side of the elastic layer of the turntable as viewed from above.

According to this configuration, since the cross section edge portion is provided with a notch which opens to a periphery side of the elastic layer of the turntable as viewed from above, an edge portion (plane edge portion) is formed in a plane at an intersection between the notch and the peripheral edge. When the clamp member is depressed, the plane edge portion deforms while remarkably increasing the contact area, and it is possible to more effectively disperse dust attached to the surface of the plane edge portion.

In the above cases, it is preferable that the cross section edge portion is formed by cutting work after the elastic layer is fixed onto the disc support surface.

According to this configuration, as compared with a case where a rubber molding is used as it is for the elastic layer, a height of the elastic layer from the disc support surface of the turntable can be formed more uniform. Accordingly, when the disc member is placed/supported on the elastic layer and the turntable is rotated, it is possible to effectively suppress the generation of a surface deflection.

Furthermore, according to a third aspect of the present invention, there is provided a turntable for rotatably supporting a disc member on a disc support surface in a state where the disc member is sandwiched and held between the turntable and a clamp member placed opposite thereto, wherein the disc support surface is provided with an elastic layer having a predetermined width, and configured to project from the disc support surface, and wherein at least one of an outer peripheral part and an inner peripheral part of the elastic layer is provided with a notch which opens to a periphery side of the turntable as viewed from above.

According to this configuration, an edge portion (plane edge portion) is formed at an intersection between the notch and the peripheral edge as viewed from above. Accordingly, when the clamp member is depressed, the plane edge portion deforms while further increasing the contact area, and it is possible to more effectively disperse dust attached to the surface of the plane edge portion.

In this case, it is preferable that a surface of the elastic layer is formed by cutting work after the elastic layer is fixed onto the disc support surface.

According to this configuration, as compared with a case where a rubber molding is used as it is for the elastic layer, a height of the elastic layer from the disc support surface of the turntable can be formed more uniform. Accordingly when the disc member is placed/supported on the elastic layer and the turntable is rotated, it is possible to effectively suppress the generation of a surface deflection.

Effects of the Invention

According to the first aspect of the present invention, at least one of the outer peripheral part and the inner peripheral part of the elastic layer is provided with the high contact pressure portion, and the contact pressure generated by the depressing movement of the clamp member in the high contact pressure portion is higher than that of other portion. Therefore, in this high contact pressure portion, elastic deformation caused by the depressing movement of the clamp member becomes greater than that of the other portion, and even if dust attaches to a surface of the turntable, it becomes easy to embed the dust into the elastic layer. Especially the high contact pressure portion is provided on at least one of the outer peripheral part and the inner peripheral part of the elastic layer. Hence, when the high contact pressure portion deforms, it deforms while increasing a contact area to push away the dust attached to the surface toward at least one of the outer periphery side and the inner periphery side of the elastic layer. Therefore, as the high contact pressure portion deforms and the contact area increases, a distance between the dust which attaches to the surface is widened, and it is possible to disperse the dust. As a result, it is possible to avoid a case where dust attached to the surface of the high contact pressure portion partially has a certain level of thickness or more on the surface, and a friction coefficient of the elastic layer surface is remarkably deteriorated, and it is possible to maintain the generation-preventing effect of a relative slip between the disc member and the disc support surface of the turntable.

According to the second aspect of the present invention, the elastic layer is provided with the cross section edge portion projecting to form a predetermined angle in a vertical cross section which cuts across the disc support surface in its radial direction. Therefore, in this cross section edge portion, elastic deformation caused by the depressing movement of the clamp member becomes extremely greater than that of the other portion, and even if dust attaches to a surface of the turntable, it becomes easier to embed the dust into the elastic layer. Especially, when the cross section edge portion deforms, it deforms while further increasing a contact area of the cross section edge portion and the dust attached to the surface of the cross section edge portion is more effectively dispersed. Therefore, it is possible to avoid a case where dust attached to the surface of the cross section edge portion partially has a certain level of thickness or more on the surface, and a friction coefficient of the elastic layer surface is remarkably deteriorated, and it is possible to maintain the generation-preventing effect of a relative slip between the disc member and the disc support surface of the turntable.

According to the third aspect of the present invention, at least one of the outer peripheral part and the inner peripheral part of the elastic layer is provided with the notch which opens to the periphery side of the elastic layer of the turntable as viewed from above, and according to this, an edge portion (plane edge portion) is formed at an intersection between the notch and the peripheral edge as viewed from above. Accordingly, when the clamp member is depressed, the plane edge portion deforms while remarkably increasing the contact area, and it is possible to more effectively disperse dust attached to the plane edge portion. Therefore, it is possible to avoid a case where dust attached to the surface of the plane edge portion partially has a certain level of thickness or more on the surface, and a friction coefficient of the elastic layer surface is remarkably deteriorated

PREFERRED EMBODIMENTS OF THE INVENTION

Embodiments of the present invention will be described below in detail with reference to the accompanying drawings.

Figure 1:
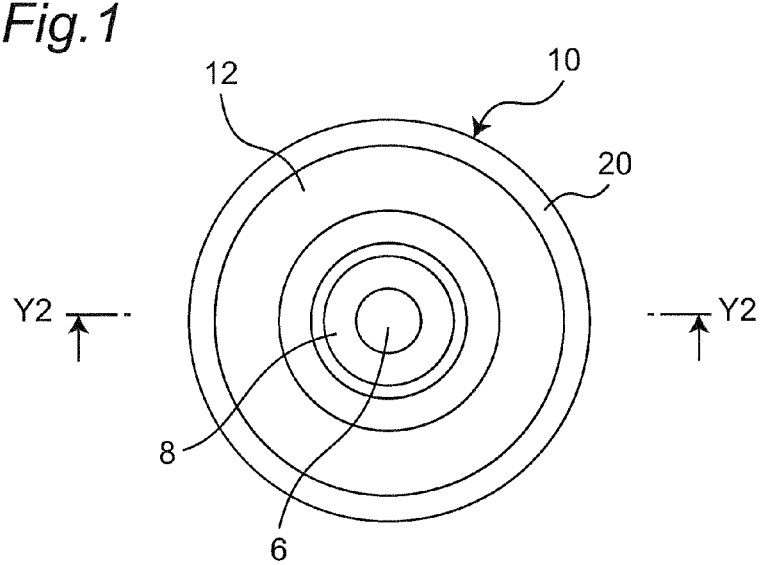
FIG. 1 is a schematic plan view showing an outline structure of a turntable according to a first embodiment of the present invention.
Figure 2:
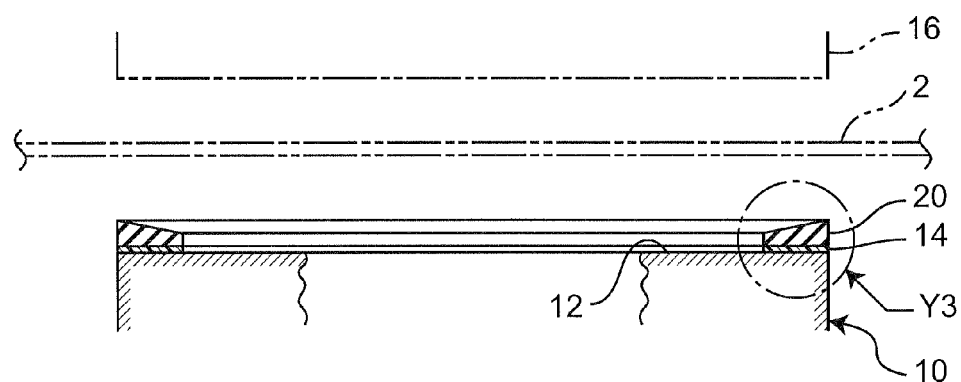
FIG. 2 is a schematic vertical sectional view of the turntable taken along a Y2-Y2 line in FIG. 1.
Figure 3:
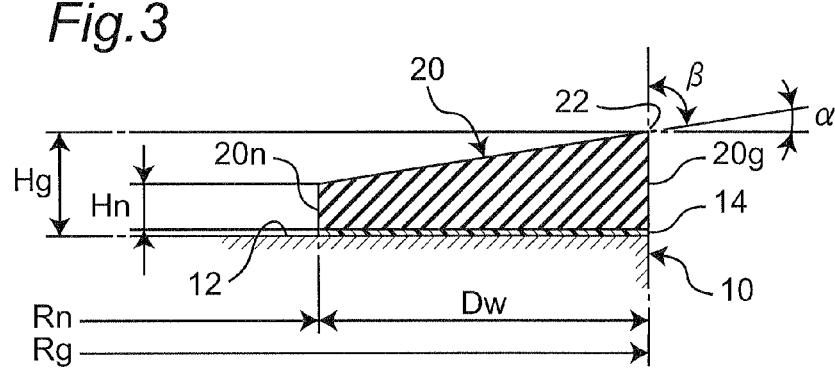
FIG. 3 is an enlarged vertical sectional view showing an essential portion Y3 in FIG. 2.

FIG. 1 is a schematic plan view showing an outline structure of a turntable according to the embodiment (first embodiment) of the present invention, FIG. 2 is a schematic vertical sectional view of the turntable taken along a Y2-Y2 line in FIG. 1, and FIG. 3 is an enlarged vertical sectional view showing an essential portion Y3 in FIG. 2.

As shown in these figures, the turntable 10 of the present embodiment includes a disc support surface 12 on which a disc member 2 such as an optical disc is placed, and an output shaft 6 of a spindle motor (not shown) is integrally assembled on a center portion of the disc support surface 12. A clamp member 16 is disposed such that it is opposed to the disc support surface 12 of the turntable 10. As will be described in detail later, an elastic layer 20 having a predetermined width is provided on the disc support surface 12, more preferably, on an outer peripheral region of the disc support surface 12. Actually, the disc member 2 is placed on an upper surface of the elastic layer 20 and is supported on the disc support surface 12 through the elastic layer 20.

In this example, an annular magnet 8 is disposed such that it surrounds the motor output shaft 6. The clamp member 16 includes a member (not shown) made of magnetic material such as steel at least at a location of the clamp member 16 opposed to the magnet 8 of the turntable 10. The disc member 2 placed on (the elastic layer 20 of) the disc support surface 12 is sandwiched and held between the turntable 10 and the clamp member 16 by a required clamping force by suction based on a magnetic force applied between the magnet 8 of the turntable 10 and a magnetic member (not shown) of the clamp member 16.

The spindle motor (not shown) is driven with the required number of rotations in a state where the disc member 2 is sandwiched and held between the turntable 10 and the clamp member 16. Thereby, the turntable 10 (thus, disc member 2) is rotated at a required rotation speed.

The above-described structures and functions of the turntable 10 and the clamp member 16 are known, and various conventional techniques can be applied. For example, a magnet 8 which generates a clamping force between the turntable 10 and the clamp member 16 may be provided on the side of the clamp member 16. A clamping force may be obtained utilizing a spring force of a spring instead of using the magnet 8.

In the present embodiment, as described above, the elastic layer 20 having the predetermined width is provided on the disc support surface 12 of the turntable 10, preferably on the outer peripheral region of the disc support surface 12 such that the elastic layer 20 projects from the disc support surface 12. More preferably, the elastic layer 20 is formed into an annular shape and basically, it is for preventing a slip from generating between the disc support surface 12 and the disc member 2. The elastic layer 20 has required elastic characteristics, and is made of elastic material capable of enhancing a friction force between the disc member 2 and the disc support surface 12. In this embodiment, chloroprene (CR) rubber is used as the elastic material for example.

Other rubber materials such as silicon rubber and EPDM can be used as the elastic material only if the rubber material has elasticity capable of restoring original shape and original dimension when the clamping force applied between the turntable 10 and the clamp member 16 is unloaded, and capable of generating a required friction force between the disc member 2 and the disc support surface 12. Further, the elastic material is not limited to rubber only if it has the elasticity and friction characteristics, and material other than rubber such as soft resin can also be used.

The elastic layer 20 is adhered and fixed to the disc support surface 12 of the turntable 10 through an adhesive layer 14. A so-called double-stick tape can be used as the adhesive layer 14. Alternatively, an adhesive may be applied and the elastic layer 20 may be adhered and fixed to the disc support surface 12.

In the present embodiment, a high contact pressure portion having a contact pressure higher than other portion is provided on at least one of an outer peripheral part 20g and an inner peripheral part 20n of the elastic layer 20 (outer peripheral part 20g of elastic layer 20 in example shown in FIGS. 1 to 3). More specifically, in the present embodiment, the high contact pressure portion is formed as an edge portion 22 (cross section edge portion) which projects to form a predetermined angle $\beta$ in a vertical cross section which cuts across the disc support surface 12 in its radial direction.

In this example, the elastic layer 20 has an outer peripheral radius Rg of about 13.7 mm, an inner peripheral radius Rn of about 11.7 mm, a height Hg of the outer peripheral part 20g of about 0.3 mm, a height Hn of the inner peripheral part 20n of about 0.2 mm, and a width Dw of about 2 mm, and a vertical cross section shape of the elastic layer 20 is trapezoid. An upper end of the outer peripheral part 20g in this cross section forms the cross section edge portion 22 as the high contact pressure portion. In this case, an inclination angle $\alpha$ ($=90°-\beta$) of a surface (upper surface) of the elastic layer 20 is about 2.9°.

A surface of the elastic layer 20 including the cross section edge portion 22 is formed by cutting work after the elastic layer 20 is adhered and fixed to the disc support surface 12.

Figure 4:
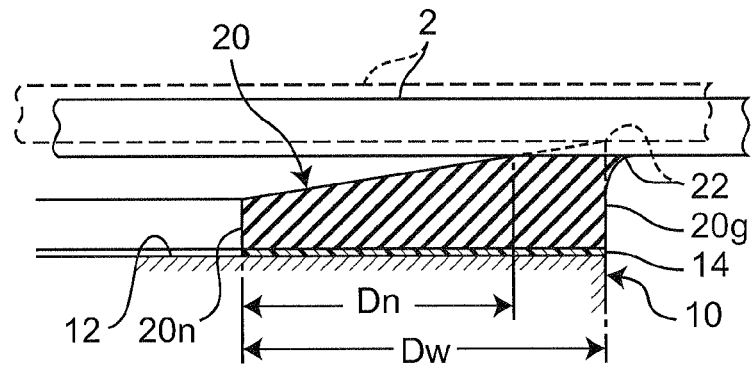
FIG. 4 is a schematic vertical sectional view showing a deformed state of an elastic layer when a clamping force is applied.

According to this configuration, when the disc member 2 is placed on (the elastic layer 20 of) the disc support surface 12 and a clamping force is applied between the turntable 10 and the clamp member 16 and the disc member 2 is sandwiched and held, a clamping force is applied from a state where the disc member 2 is placed (state where only weight of disc member 2 is applied) shown by a broken line in FIG. 4, and the elastic layer 20 is elastically deformed as shown by a solid line in FIG. 4.

At this time, at the high contact pressure portion (cross section edge portion 22) of the elastic layer 20, elastic deformation caused by application of the clamping force becomes greater than that of other portion of the elastic layer 20. Especially since the high contact pressure portion is formed as the cross section edge portion 22, elastic deformation at this time can remarkably be increased. In a range of a width Dn from the inner peripheral part 20n of the elastic layer 20, the elastic layer 20 does not come into contact with the disc member 2, and this range does not deform at all.

Figure 5:
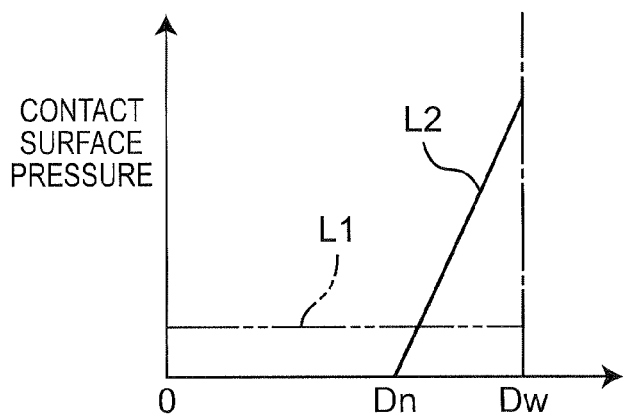
FIG. 5 is a graph schematically showing variation in a contact surface pressure of the elastic layer in its width direction when the clamping force is applied.

FIG. 5 is a diagram schematically showing variation in a contact surface pressure of the elastic layer in its width direction when the clamping force is applied from the inner peripheral part 20n of the elastic layer 20 as an origin. In FIG. 5, a solid line graph L2 shows variation in a contact surface pressure of the elastic layer 20 shown in FIG. 4. A two-dot chain line graph L1 shows, in comparison, a case where a front surface of the elastic layer is in parallel to a back surface thereof, any high contact pressure portion is not provided, and the vertical cross section is formed into a rectangle.

As can be seen from FIG. 5, when the front surface of the elastic layer is in parallel to the back surface and any high contact pressure portion is not provided (see two-dot chain line graph L1), the contact surface pressure is constant. In contrast, in the case of the present embodiment where the outer peripheral part 20g of the elastic layer 20 is provided with the high contact pressure portion (cross section edge portion 22) (see solid line graph L2), a contact surface pressure is 0 (zero) in the range of the width Dn from the inner peripheral part 20n of the elastic layer 20, a contact surface pressure generates steeply in a range from a part corresponding to the width Dn to a part corresponding to the outer peripheral part 20g (width Dw), and an extremely high contact surface pressure is applied to the outer peripheral part 20g.

As described above, in the present embodiment, since the high contact pressure portion (specifically, cross section edge portion 22) having contact pressure caused by application of the clamping force higher than other portion is provided, even when dust attaches to the surface, it is easy to embed the dust in the elastic layer 20. Especially since the high contact pressure portion is provided on the outer peripheral part 20g of the elastic layer 20, when the high contact pressure portion deforms, it deforms while increasing the contact area to push away dust attached to the surface of the high contact pressure portion toward the outer periphery side of the elastic layer 20, and the dust attached to the surface of the high contact pressure portion can be dispersed more effectively. According to this configuration, it is possible to effectively avoid a case where dust attached to the surface of the elastic layer 20 partially has a certain level of thickness or more on the surface of the elastic layer 20 and a friction coefficient of the surface of the elastic layer 20 is remarkably deteriorated, and it is possible to maintain the generation-preventing effect of a relative slip between the disc member 2 and the disc support surface 12 of the turntable 10.

According to the present embodiment, the high contact pressure portion is formed by the cross section edge portion 22 which projects to form the predetermined angle β in the vertical cross section which cuts across the disc support surface 12 in the radial direction. According to this configuration, the elastic deformation caused by the application of the clamping force becomes remarkably greater than that of the other portion of the elastic layer 20, and even if dust attached to the surface, it is possible to more easily embed the dust in the elastic layer. When the cross section edge portion 22 deforms, it deforms while further increasing the contact area to push away dust attached to the surface thereof toward the outer periphery side of the elastic layer 20, and it is possible to more effectively disperse the dust attached to the surface of the cross section edge portion 22.

Also, according to the present embodiment, when the high contact pressure portion (cross section edge portion 22) is provided on the surface of the elastic layer 20, as described above, the high contact pressure portion (cross section edge portion 22) is formed by the cutting work after the elastic layer 20 is adhered and fixed to the disc support surface 12. This cutting work is carried out in such a manner that the turntable 10 is rotated and in this state, a cutting bit is applied to the surface of the elastic layer 20. Alternatively, the elastic layer 20 may be cut in its thickness direction to reduce its rubber thickness by a knife edge.

Therefore, as compared with a case where a rubber molding is used as the elastic layer 20 as it is, it is possible to uniform the height of the elastic layer 20 (height Hg of cross section edge portion 22 at highest outer peripheral part 20g) from the disc support surface 12 of the turntable 10, and when the disc member 2 is placed/supported on the elastic layer 20 and the turntable 10 is rotated, it is possible to extremely effectively suppress the generation of the surface deflection.

Dimension specifications of the trapezoid (see FIG. 3) forming the vertical cross section of the elastic layer 20 is preferably set within the following ranges when the outer peripheral radius Rg is about 13.7 mm for example or the inner peripheral radius Rn is about 11.7 mm for example.

Width Dw of elastic layer 20: about 0.5 to 2 mm
  (preferably 2 mm)
Height Hn of inner peripheral part 20n: 0 to 0.2 mm
  (preferably 0.2 mm)
Height Hg of outer peripheral part 20g: about 0.2 to 0.5 mm
  (preferably 0.25 to 0.5 mm)
Inclination angle α of upper surface of elastic layer 20: about 0.5 to 45°
  (preferably 1 to 10°)

In the above described embodiment (first embodiment), the cross section edge portion 22 as the high contact pressure portion is formed on the outer peripheral part 20g of the elastic layer 20, but the cross section edge portion is not limited to the outer peripheral part of the elastic layer, and it may be provided on another portion.

Next, modifications of the present embodiment will be described. In the following description, portions having the same configuration and function as those of the embodiment described with reference to FIGS. 1 to 5 are designated with the same symbols and further descriptions thereof will be omitted.

Figure 6:
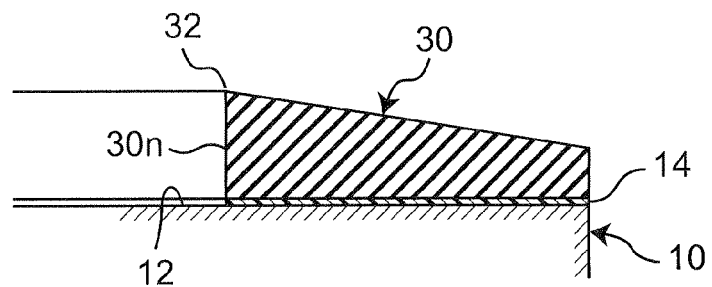
FIG. 6 is a schematic vertical sectional view of an elastic layer according to a first modification of the first embodiment.

FIG. 6 is a schematic vertical sectional view of an elastic layer 30 according to a first modification of the embodiment. In the first modification, a cross section edge portion 32 is formed on an inner peripheral part 30n of the elastic layer 30.

Figure 7:
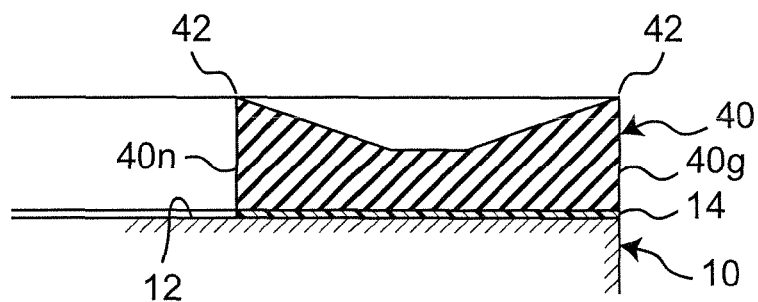
FIG. 7 is a schematic vertical sectional view of an elastic layer according to a second modification of the first embodiment.

FIG. 7 is a schematic vertical sectional view of an elastic layer 40 according to a second modification of the embodiment. In the second modification, a cross section edge portion 42 is formed on both an inner peripheral part 40n and an outer peripheral part 40g of the elastic layer 40.

Figure 8:
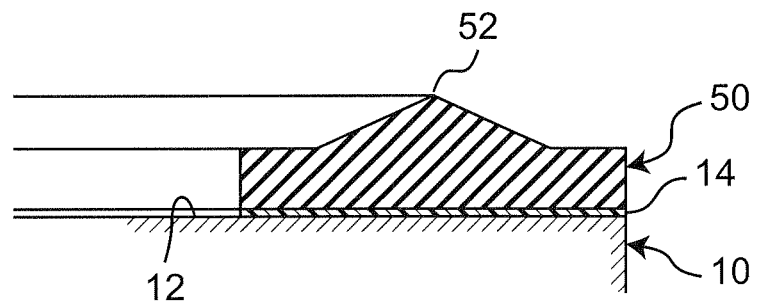
FIG. 8 is a schematic vertical sectional view of an elastic layer according to a third modification of the first embodiment.
Figure 9:
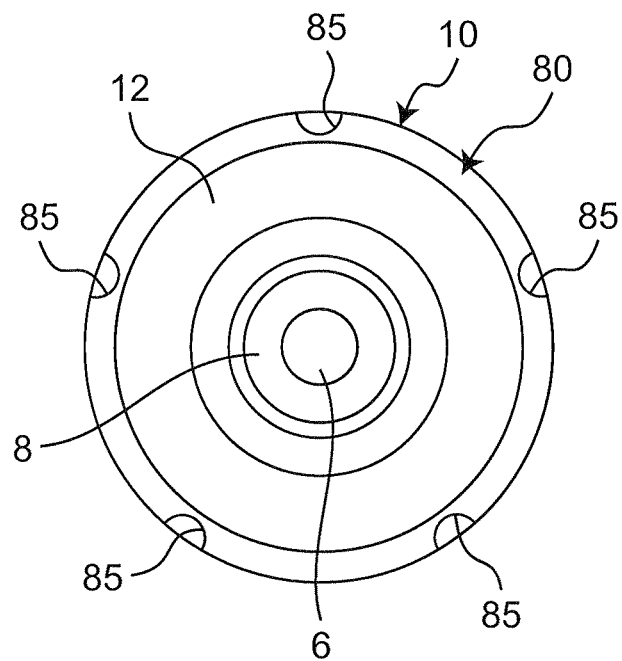
FIG. 9 is a schematic plan view showing an outline structure of a turntable according to a second embodiment of the invention.

FIG. 8 is a schematic vertical sectional view of an elastic layer 50 according to a third modification of the embodiment. In the third modification, a cross section edge portion 52 is formed on a substantially central portion of the elastic layer 50 in its width direction.

Figure 14:
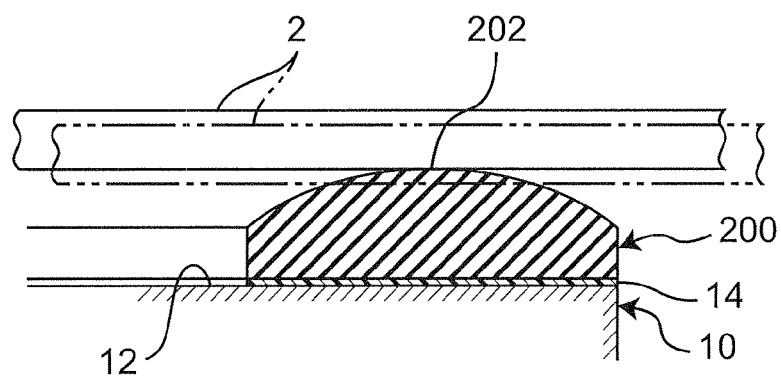
FIG. 14 is a schematic vertical sectional view of a turntable including an elastic layer according to a comparative example of the first embodiment.

When the high contact pressure portion is provided on a surface of the elastic layer, as shown in FIG. 14 for example, it is possible to employ a configuration that a convex high contact pressure portion 202 whose surface is formed into an arc is formed such that a substantially central portion of the elastic layer 200 in its width direction is the highest. In this case, a vertical cross section of the elastic layer 200 is close to so-called semi-circular in shape.

In the case of this comparative example, however, a high contact pressure like the cross section edge portion of the embodiment can not be obtained as apparent from comparison with the vertical cross section shapes. Therefore, when dust attaches to the surface, a function for embedding the dust into the elastic layer is much inferior to the embodiment.

Further, the convex high contact pressure portion 202 is formed such that the substantially central portion of the elastic layer 200 in its width direction is the highest and the contact surface pressure at the substantial central portion of the elastic layer 200 in the width direction is the highest. Therefore, the high contact pressure portion 202 deforms by the application of the clamping force such that it is compressed in the vertical direction (see two-dot chain line in FIG. 14), and it can not be expected that the high contact pressure portion 202 deforms such that dust attached to the surface thereof is pushed away toward its outer periphery or inner periphery unlike the present embodiment in which the high contact pressure portion is provided on the outer peripheral part or the inner peripheral part of the elastic layer. Therefore, as the high contact pressure portion deforms and its contact area increases, a distance between the dust is increased, and it is not possible to expect the effect that the dust attached to the surface is dispersed.

In the present embodiment, when the high contact pressure portion is the cross section edge portion, an extremely high contact pressure can be obtained when a clamping force is applied, and when dust attaches to the surface, the dust can easily be embedded into the elastic layer.

When the high contact pressure portion is provided on one of (or both of) the outer peripheral part and the inner peripheral part of the elastic layer, the high contact pressure portion deforms when a clamping force is applied such that dust attached to the surface is pushed away toward the outer periphery side or the inner periphery side of the elastic layer. Therefore, as the high contact pressure portion deforms and the contact area increases, a distance between dust attached to the surface is increased, and it is possible to disperse the dust. As a result, it is possible to effectively avoid a case where dust attached to the surface of the high contact pressure portion partially has a certain level of thickness or more on the surface and the friction coefficient of the surface is remarkably lowered, and it is possible to maintain the generation-preventing effect of a relative slip between the disc member and the disc support surface of the turntable.

Next, a second embodiment of the prevent invention will be described with reference to FIGS. 9 to 12.

In description of the second embodiment also, portions having the same configuration and function as those of the first embodiment are designated with the same symbols and further descriptions thereof will be omitted.

In this second embodiment, notches 85 which open toward a periphery side as viewed from above are provided in at least one of an outer peripheral part 80g and an inner peripheral part 80*n* (outer peripheral part 80*g* in this embodiment) of the elastic layer 80. In this example, five notches 85 are provided at equal distances from one another in the circumferential direction, and the notches 85 are formed by a stamping operation using a press machine for example. In this example, a front surface of the elastic layer 80 is in parallel to a back surface thereof as can be seen from FIG. 12, and the high contact pressure portion as in the first embodiment is not particularly provided.

Figure 10:
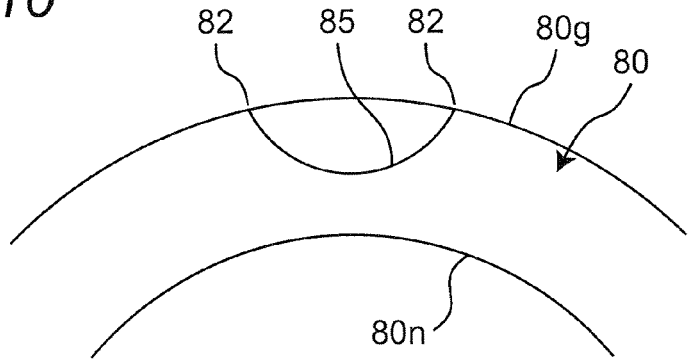
FIG. 10 is an enlarged plan view showing an essential portion FIG. 9.

However, by providing the notches 85, as shown in FIG. 10, edge portions (plane edge portions) 82 are formed at an intersection between an arc peripheral edge of each of the notches 85 and the outer peripheral part 80*g* of the elastic layer 80.

Figure 11:
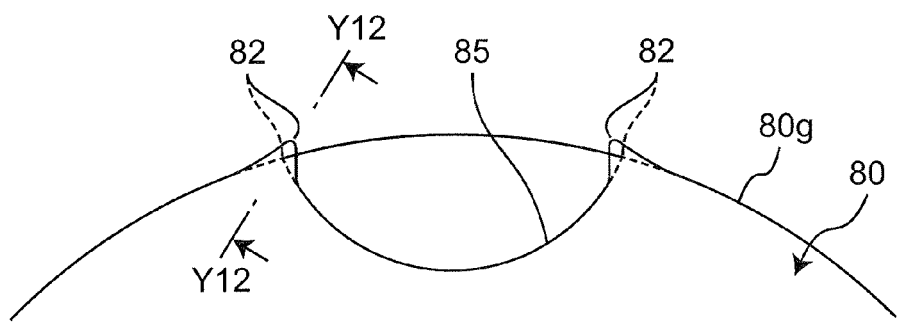
FIG. 11 is an enlarged plan view schematically showing a deformed state of an elastic layer when a clamping force is applied.
Figure 12:
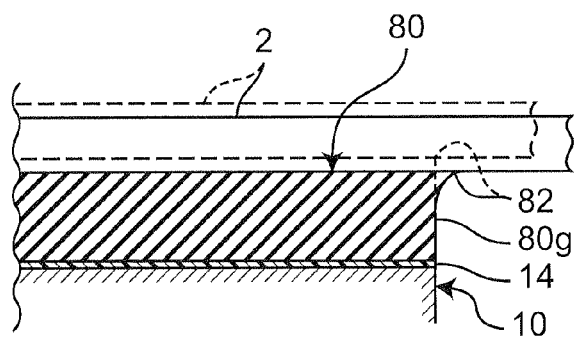
FIG. 12 is a schematic vertical sectional view of a turntable taken along a line Y12-Y12 in FIG. 11.

In this configuration, when the disc member 2 is placed on (the elastic layer 80 of) the disc support surface 12 and a clamping force is applied between the turntable 10 and the clamp member 16 to sandwich and hold the disc member 2, the clamping force is applied from the placed state (state where only the weight of the disc member 2 is applied) shown by broken lines in FIGS. 11 and 12, and the elastic layer 80 elastically deforms as shown by solid lines in FIGS. 11 and 12.

At this time, the plane edge portion 82 deforms while further increasing the contact area diagonally outward by the application of the clamping force, and dust attached to the surface of the plane edge portion 82 can more effectively be dispersed. Therefore, it is possible to avoid a case where dust attached to the surface of the plane edge portion 82 partially has a certain level of thickness or more on the surface and the friction coefficient on the surface of the plane edge portion 82 is remarkably lowered.

In this case also, more preferably, a surface of the elastic layer 80 is formed by the cutting work after the elastic layer 80 in which the notches 85 are formed is fixed to the disc support surface 12.

Therefore, as compared with a case where a rubber molding is used as the elastic layer 80 as it is, it is possible to form the elastic layer 80 such that a height thereof from the disc support surface 12 is uniform, and when the disc member 2 is placed/supported on the elastic layer 80 and the turntable is rotated, it is possible to extremely effectively prevent from the generation of the surface deflection.

Although the notches 85 are formed on the side of the outer peripheral part 80*g* of the elastic layer 80 in FIGS. 9 to 12, the notches 85 may open toward the inner peripheral part 80*n*. Alternatively, the notch may be formed in both the outer peripheral part 80*g* and the inner peripheral part 80*n*.

Figure 13:
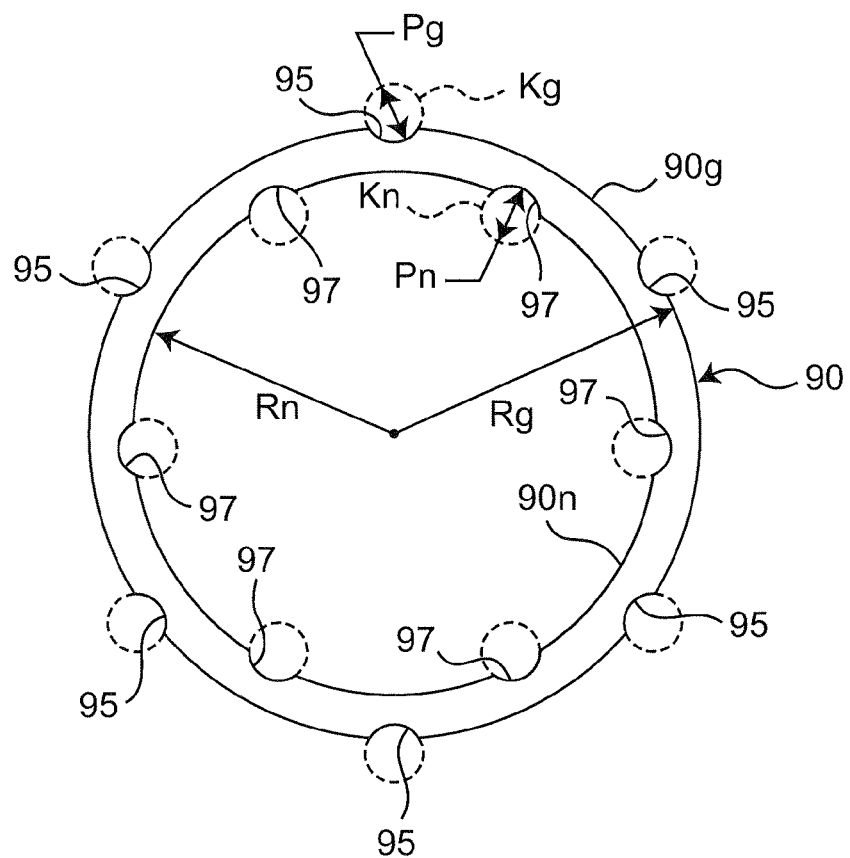
FIG. 13 is a schematic plan view of an elastic layer according to a modification of the second embodiment.

In an example shown in FIG. 13, a plurality of notches 95 which open toward the outer peripheral part 90*g* are formed in an outer periphery side of an elastic layer 90, and also a plurality of notches 97 which open toward an inner peripheral part 90*n* are formed in an inner periphery side of the elastic layer 90. In this case, the six notches 95 are formed in the outer periphery side at equal distances from one another in the circumferential direction, and the six notches 97 are formed in the inner periphery side at equal distances in the circumferential direction from one another such that the notches 97 are located between the notches 95. In this embodiment also, the front surface of the elastic layer 90 is in parallel to its back surface, and the high contact pressure portion in the first embodiment is not particularly provided.

In this case, the notches 95 and 97 are formed as portions of arcs by a stamping operation using a press machine for example. Diameters Pg and Pn of stamping holes Kg and Kn for forming the arcs (notches 95, 97) can variously be changed. In the example in FIG. 13, an outer peripheral radius Rg of the elastic layer 90 is about 13.7 mm, and an inner peripheral radius Rn of the elastic layer 90 is about 11.7 mm for example. The diameters Pg and Pn of the stamping holes Kg and Kn are set to Pg=Pn=4 mm.

When the outer peripheral radius Rg is about 13.7 mm or the inner peripheral radius Rn is about 11.7 mm for example, it is preferable that the number of arcs configuring the notches 95 and 97 of the elastic layer 20 and the diameters Pg and Pn of the stamping holes Kg and Kn are set in the following range.

Diameters (Pg=Pn) of stamping holes Kg, Kn: about 1 to 10
  (preferably 2 to 6 mm)
Number of notches 95 of outer peripheral part 90*g*: 0 to 20
  (preferably 4 to 10)
Number of notches 97 of inner peripheral part 90*n*: 0 to 20
  (preferably 0 to 10)

However, both number of outer peripheral part and number of inner peripheral part should not be 0.

According to the above-described second embodiment (FIGS. 9 to 13) of the invention, the front surface of the elastic layer 80, 90 is in parallel to the back surface, and the high contact pressure portion in the first embodiment is not particularly provided. However, such a high contact pressure portion or the cross section edge portion may be provided, and these high contact pressure portion or cross section edge portion may be provided with the notches which open toward the periphery side as viewed from above in at least one of the outer peripheral part and the inner peripheral part of the elastic layer.

Although all of the stamping holes for forming the notches are circular in shape and each of the notches is formed as an arc which configures a portion of a circle in the above description, the shape of the notch is not limited to such a shape, and the shape may be configured as a portion of a triangle, a rectangle or a polygon having more angle portions for example.

Further, although the notches are formed by forming the stamping holes in the outer periphery side and/or inner periphery side of the elastic layer in the above description, instead of this configuration, or in addition thereto, the stamping holes may be provided at a central portion of the elastic layer in its width direction.

In order to confirm a function and an effect of the turntable of the above-described embodiments of the present invention, a confirmation test was carried out. An explanation about the confirmation test will be described below. In the confirmation test, the following three kinds of samples were used, i.e., "example 1 of the present invention" in which the elastic layer of the turntable was provided with the high contact pressure portion or the cross section edge portion as described above, "example 2 of the present invention" in which in addition to the high contact pressure portion (or cross section edge portion), the peripheral part of the elastic layer was provided with notches (or plane edge portions), and "conventional product" in which an elastic layer of a turntable was not provided with any high contact pressure portions and a peripheral part of the elastic layer was not provided with any notches. The "example 1 of the present invention" corresponds to the first embodiment, and the "example 2 of the present invention" corresponds to a combination of the first embodiment and the second embodiment.

In the confirmation test, the same amount of cotton fiber representing cilia-like dust was made to attach to an elastic layer of a turntable of each of the samples, an optical disc was placed on the sample, a predetermined clamping force was applied by a clamp member, and slip characteristics when a rotation torque was applied to the optical disc in this clamp state were evaluated while measuring the rotation torque. Commercially available cotton fiber used for experiments or the like having a diameter of about 20 μm was used as the cotton fiber representing cilia-like dust.

Figure 15:
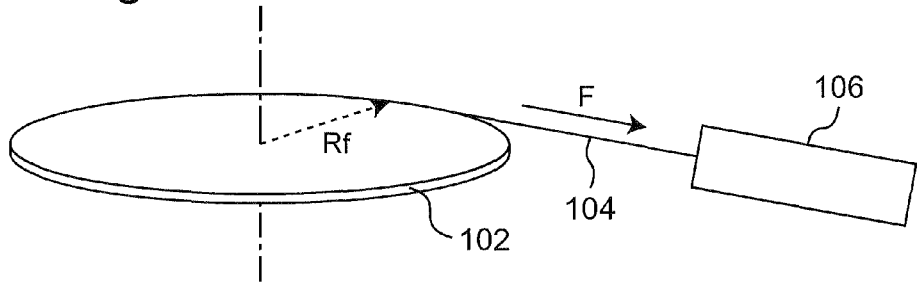
FIG. 15 is a schematic explanatory diagram showing a measuring method of a slip torque in a confirmation test of a function effect of the invention.

The rotation torque can be measured in the following manner: that is, as schematically shown in FIG. 15, one end of a string 104 is fixed to an outer periphery of a disc 102, the other end of the string 104 is connected to a conventionally known force gage 106, and the string 104 is pulled in a tangential direction of the outer periphery of the disc 102 through the force gage 106, thereby measuring the rotation torque. If a radius of the disc 102 is defined as Rf, a torque value Tf when a tensile force F is applied to the string 104 is expressed by the following equation. This tensile force F can be measured by the force gage 106.

$$Tf = F \times Rf$$

In the confirmation test, the turntable described with reference to FIGS. 1 to 4 was used as the sample of the "example 1 of the invention". That is, in the turntable, the vertical cross section of the elastic layer was formed into the trapezoid, the upper end of the outer peripheral part in the cross section forms the cross section edge portion as the high contact pressure portion, and essential specifications of the elastic layer used in the sample were as follows.

The outer peripheral radius Rg was about 13.7 mm, the inner peripheral radius Rn was about 11.7 mm, the height Hg of the outer peripheral part was about 0.3 mm, the height Hn of the inner peripheral part was about 0.2 mm, the width Dw was about 2 mm, and the inclination angle α (=90°−β) of the surface (upper surface) of the elastic layer was about 2.9°.

As the sample of the "example 2 of the invention", a turntable in which an elastic layer had the vertical cross section shape and essential specifications were the same as those of the "example 1 of the invention" was used. In the sample, five notches were formed in an outer peripheral part of the elastic layer at equal distances from one another in the circumferential direction by a stamping operation of diameter 4 mm.

Further, as the "conventional product", a turntable in which an outer peripheral radius and an inner peripheral radius (and thus also width) of an elastic layer were the same as those of the examples 1 and 2 of the invention was used. In the turntable, the height (thickness) of the elastic layer was uniform and was about 0.3 mm.

As a material of the elastic layer, chloroprene (CR) rubber was used in any of the examples 1 and 2 of the invention and the conventional product. It has required elastic characteristics and capable of enhancing a friction force between a disc support surface and a disc.

Figure 17:
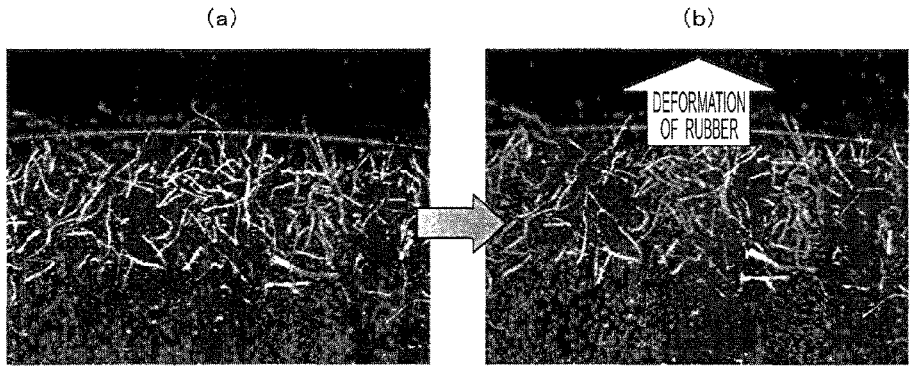
FIG. 17 are microscope photographs showing one example of a state where cotton fiber representing cilia-like dust attaches to an elastic layer.

FIG. 17 show one example of a state where cotton fiber representing cilia-like dust attaches to an elastic layer. FIG. 17 show a case (FIG. 17A) where a disc plate made of transparent glass was placed on a turntable (that is, on an elastic layer) of the example 1 of the present invention and only a weight of the disc plate is applied, and a case (FIG. 17B) where the disc plate was pressed with a predetermined clamp pressure, and in both the cases, a high contact pressure portion (cross section edge portion) of the elastic layer was observed by a microscope with 30 magnification.

The above-described samples and the cotton fiber representing cilia-like dust were prepared, one end of the string 104 was fixed to the outer periphery of the disc 102 and the other end was connected to the force gage 106 and the test was carried out by the following procedure.

(1) A spindle motor of a disc drive is fixed so that it does not rotate. According to this operation, the turntable is fixed so that it does not rotate.

(2) A predetermined amount of dust (cotton fiber) is made to attach to the elastic layer on the disc support surface of the turntable as uniform as possible. The amount of dust attached in each of the samples is zero (i.e., no dust) at the time of initial state of the test and then, the amount was gradually increased.

(3) The disc is placed on the turntable and a predetermined clamping force is applied by the clamp member.

(4) In this clamp state, the string 104 whose one end is fixed to the outer periphery of the disc 102 is pulled through the force gage 106 as shown in FIG. 15.

(5) The tensile force F is gradually increased and the tensile force F when the disc 102 starts slipping is measured.

(6) A torque (slip torque) when the slip starts is calculated from the tensile force F when the slip starts and the radius Rf of the disc 102.

For example, in the case of a disc drive in which standard number of rotations of a disc is about 8,000 rpm to 13,000 rpm, if a slip is generated on the disc with a low rotation torque of about 20 mNm or less, there is the experience that it becomes difficult to appropriately control a focus. Hence, in the confirmation test, 20 mNm was determined as a lower limit reference value of the slip torque, and if the slip torque became lower than this value, the test was determined as NG.

In the "conventional product", an amount of dust attached when the slip torque reached the lower limit reference value (20 mNm) was determined as "1" as a reference, and the test was carried out while the amount of dust attached was increased to two to six times.

Figure 16:
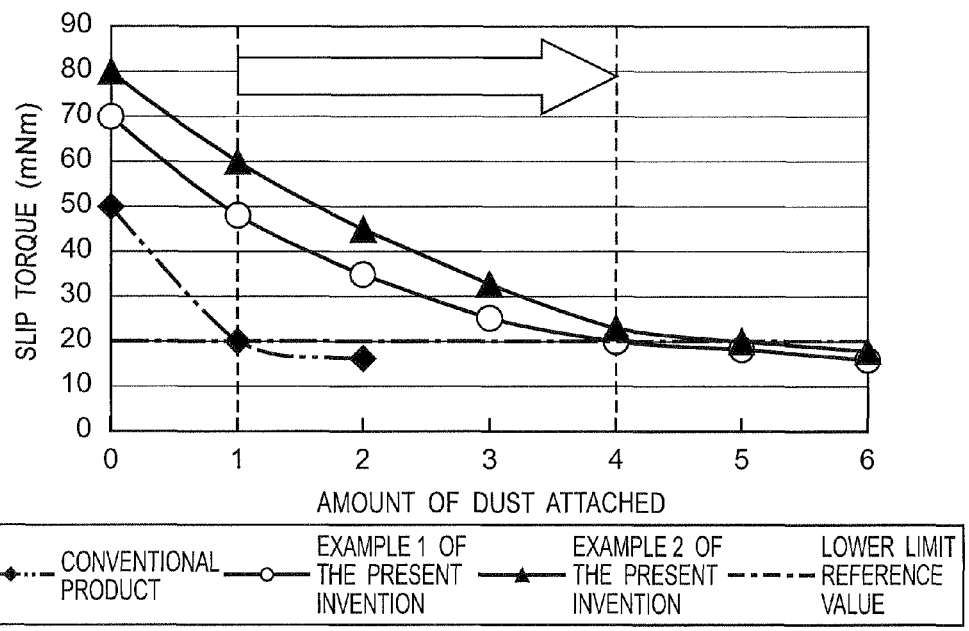
FIG. 16 is a graph showing a result of the confirmation test.

Results of the test are shown in FIG. 16. As can be understand from the graph in FIG. 16, in the case of the "example 1 of the present invention", the amount of dust attached when the slip torque reached the lower limit reference value (20 mNm) was four times of the "conventional product", and in the case of the "example 2 of the present invention", the amount of dust attached was five times of the "conventional product". That is, a so-called slip lifetime during which a slip generated on a disc because dust attaches was extended to four to five times of the "conventional product" if the turntable of the present invention was used. And it was confirmed that the turntable of the present invention can be very effective countermeasure to suppress the slip of a disc caused by attachment of dust.

Although 20 mNm was employed as the lower limit reference value of the slip torque in this test, this value can be changed depending upon kinds of disc drives, driving conditions of discs and the like. When it is estimated that a slip of a disc is less prone to be generated, for example, when rise of the number of rotations of a disc at the time of actuation is gentler, or when it is estimated that standard number of rotations of a disc is lower and variation in the number of rotations is lower, a lower value may be employed as the lower limit reference value of the slip torque.

The present invention is not limited to the above-described embodiments, and the present invention can variously be improved or changed in design of course within a range without departing from the gist of the present invention.

INDUSTRIAL APPLICABILITY

The invention can effectively be applied to a turntable for rotatably supporting a disc member such as an optical disc.

EXPLANATION OF REFERENCE SYMBOLS

2 Disc member
10 Turntable

12 Disc support surface
16 Clamp member
20, 30, 40, 50, 80, 90 Elastic layer
20g, 40g, 80g, 90g Outer peripheral part of elastic layer
20n, 30n, 40n, 80n, 90n Inner peripheral part of elastic layer
22, 32, 42, 52 High contact pressure portion (Cross section edge portion)
82 Plane edge portion
85, 95, 97 Notch

The invention claimed is:

1. A turntable for rotatably supporting a disc member on a disc support surface in a state where the disc member is sandwiched and held between the turntable and a clamp member placed opposite thereto, wherein
the disc support surface is provided with an elastic layer having a predetermined width, and configured to project from the disc support surface,
at least one of an outer peripheral part and an inner peripheral part of the elastic layer is provided with a high contact pressure portion of which a contact pressure generated by pressing the clamp member thereto is higher than that of any portion of the elastic layer other than the high contact pressure portion,
the high contact pressure portion is formed by an edge portion projecting to form a predetermined angle in a vertical cross section which cuts across the disc support surface in its radial direction, and
an inclination angle of an upper surface of the elastic layer is from about 0.5° to about 45°.

2. The turntable according to claim 1, wherein the high contact pressure portion is provided with a notch which opens to a periphery side of the turntable as viewed from above.

3. The turntable according to claim 1, wherein the high contact pressure portion is formed by cutting work after the elastic layer is fixed onto the disc support surface.

4. The turntable according to claim 2, wherein the high contact pressure portion is formed by cutting work after the elastic layer is fixed onto the disc support surface.

5. The turntable according to claim 1, wherein an inclination angle of an upper surface of the elastic layer is from about 1° to about 10°.

6. The turntable according to claim 1, wherein the high contact pressure portion is configured such that the contact pressure applied to the high contact pressure portion causes the high contact pressure portion to deform and increase a contact area of an upper surface of the elastic layer.

* * * * *